US009113386B2

(12) United States Patent
Charriere et al.

(10) Patent No.: US 9,113,386 B2
(45) Date of Patent: Aug. 18, 2015

(54) FAST HANDOVER WITH REDUCED SERVICE INTERRUPTION FOR HIGH SPEED DATA CHANNELS IN A WIRELESS SYSTEM

(75) Inventors: Patrick Georges Charriere, Oxfordshire (GB); Fang-Chen Cheng, Randolph, NJ (US); Philip Charles Sapiano, Wiltshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 744 days.

(21) Appl. No.: 10/987,944

(22) Filed: Nov. 12, 2004

(65) Prior Publication Data
US 2006/0116118 A1 Jun. 1, 2006

(51) Int. Cl.
*H04W 36/00* (2009.01)
*H04W 36/30* (2009.01)

(52) U.S. Cl.
CPC ................... *H04W 36/30* (2013.01)

(58) Field of Classification Search
CPC ...... H04W 36/30; H04W 36/18; H04W 36/08
USPC .......................................... 455/423, 436–444
See application file for complete search history.

(56) References Cited

U.S. PATENT DOCUMENTS

| 6,018,661 | A  | * | 1/2000 | Raith et al. ........... 455/437 |
| 6,246,878 | B1 | * | 6/2001 | Wallentin ............. 455/442 |
| 6,549,524 | B1 |   | 4/2003 | Sin ....................... 370/331 |
| 6,708,030 | B1 | * | 3/2004 | Horikawa ............. 455/436 |
| 6,757,536 | B1 | * | 6/2004 | Kim et al. ............. 455/436 |
| 6,799,045 | B1 |   | 9/2004 | Brouwer ............... 455/453 |
| 7,212,503 | B2 | * | 5/2007 | Duncan Ho et al. .. 370/311 |
| 2002/0045451 | A1 | * | 4/2002 | Hwang et al. ........ 455/442 |
| 2002/0141360 | A1 | * | 10/2002 | Baba et al. ........... 370/331 |
| 2004/0100921 | A1 | * | 5/2004 | Khan .................... 370/321 |
| 2004/0209638 | A1 | * | 10/2004 | Beckman et al. ..... 455/522 |
| 2005/0048920 | A1 | * | 3/2005 | Liu ........................ 455/63.1 |
| 2006/0068712 | A1 | * | 3/2006 | Kroboth et al. ....... 455/67.11 |
| 2006/0068789 | A1 | * | 3/2006 | Vannithamby et al. 455/436 |

FOREIGN PATENT DOCUMENTS

WO WO 01/39403 A1 5/2001

OTHER PUBLICATIONS

Bhushan, Naga , "1xEV-DO Reverse Link Physical Layer Enhancement Proposal," Apr. 14, 2003 pp. 1-27.
3rd Generation Partnership Project; Technical Specification Group Radio Access Network; Physical layer procedures (FDD) (Release 5), Dec. 2003.

(Continued)

*Primary Examiner* — Justin Lee
(74) *Attorney, Agent, or Firm* — Davidson Sheehan LLP (57) ABSTRACT

In one aspect of the instant invention, a method is provided for controlling a communications system that includes a mobile device, a first and second base station and a radio network controller. The method comprises establishing the first base station as a primary base station that communicates high speed data to the mobile device. A parameter associated with the first and a second base stations, such as signal strength or quality, is monitored, and a level one type signal is sent to the first and second base stations indicating that the second base station is the primary base station in response to the monitored parameter associated with the second base station exceeding the monitored parameter associated with the first base station.

20 Claims, 5 Drawing Sheets

(56) References Cited

OTHER PUBLICATIONS

European Search Report EP 05 25 6616 dated Jan. 18, 2006.
"Physical Layer Aspects of UTRA High Speed Downlink Packet Access" $3^{RD}$ Generation Partnership Project; Technical Specification Group Radio Access Network; (Release 4) Mar. 2001.
"Comparison of Fast Cell Selection Alternatives" $3^{rd}$ Generation Partnership Project, TSG-RAN WG1#28bis R1-02-1242, Espoo, Finland Oct. 8-9, 2002.
"Physical Layer Aspects of UTRA High Speed Downlink Packet Access", 3GPP TR 25.848 V4.0.0 (Release 4), Mar. 1, 2001, 4 pages.
Troels Emil Kolding et al., "High Speed Downlink Packet Access: WCDMA Evolution", IEEE Vehicular Technology Society News, Feb. 1, 2003, 8 pages.
Keiji Tachikawa, "W-CDMA Mobile Communication Scheme", Maruzen Inc., Jun. 25, 2001, p. 107, p. 128-130.
English Summary of "W-CDMA Mobile Communication Scheme", Keiji Tachikawa, Nov. 20, 2014, 2 pages.

\* cited by examiner

FAST HANDOVER WITH REDUCED SERVICE INTERRUPTION FOR HIGH SPEED DATA CHANNELS IN A WIRELESS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various users within the area, fixed or mobile, may then access the system and, thus, other interconnected telecommunications systems, via one or more of the base stations. Typically, a mobile device maintains communications with the system as the mobile device passes through an area by communicating with one and then another base station, as the user moves. The mobile device may communicate with the closest base station, the base station with the strongest signal, the base station with a capacity sufficient to accept communications, etc.

Historically, the mobile device has been used for voice communications where the delivery of information is time critical. That is, if even relatively short segments of a conversation are delayed or lost, the meaning and understanding of the parties to the conversation may be substantially impaired. During the period when the mobile device is discontinuing communications with a first base station and beginning communications with a second base station, there is a distinct possibility that communications will be at least temporarily interrupted or delayed. Thus, for voice communications, a process known as soft hand off (SHO) was developed in the CDMA and UMTS systems to have multiple connections in the region of overlapped coverage in order to substantially enhance the likelihood that the conversation will continue unabated even during these transition periods.

Recently, the operation of mobile devices has been extended to the field of high speed data, such as might be employed when accessing the Internet or the World Wide Web. The exchange of high speed data, unlike voice communications, has historically not been time critical. That is, the transmission of data may be temporarily interrupted or delayed without affecting a receiver's ability to "understand" the data. Thus, temporary delays or interruptions during the transition period from one base station to another have been acceptable.

However, the use of high speed data connections has expanded to operations that are more time critical. For example, Voice over Internet Protocol (VoIP) is a process that involves digitizing voice signals, organizing the digitized voice signals into packets, and transmitting the packets over a high speed digital connection. A receiving party reassembles the packets and plays the packets to produce an audio communication. Thus, voice communications can be accomplished over a high speed data connection. If this process can be accomplished in real time, then a conversation may occur across the high speed digital connection. Where the high speed digital connection is being used for voice communications, then the transition periods become significant so as to avoid delaying or interrupting the conversation.

Typically, because data is not time sensitive, high speed data channels have not implemented handover techniques to prevent delays during the handoff process. Rather, the process of handover has commonly been implemented using Level three (L-3) signaling, which is relatively slow, further exacerbating the problem of delays in the handoff process.

The present invention is directed to overcoming, or at least reducing, the effects of one or more of the problems set forth above.

SUMMARY OF THE INVENTION

In one aspect of the instant invention, a method is provided for controlling a communications system. The method comprises establishing a first base station as a primary base station. At least one parameter associated with the first base station and a second base station are monitored, and a level one type signal is sent to the first and second base stations indicating that the second base station is the primary base station in response to the monitored parameters.

In another aspect of the instant invention, a method is provided for controlling a communications system that includes a first and second base station and a radio network controller. The method comprises establishing the first base station as a primary base station. A level one type signal is received at the first and second base stations indicating that the second base station is the primary base station, and a signal is transmitted from each of the first and second base stations to the radio network controller indicating that the second base station is the primary base station. Thereafter, data from the radio network controller is directed to the second base station.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
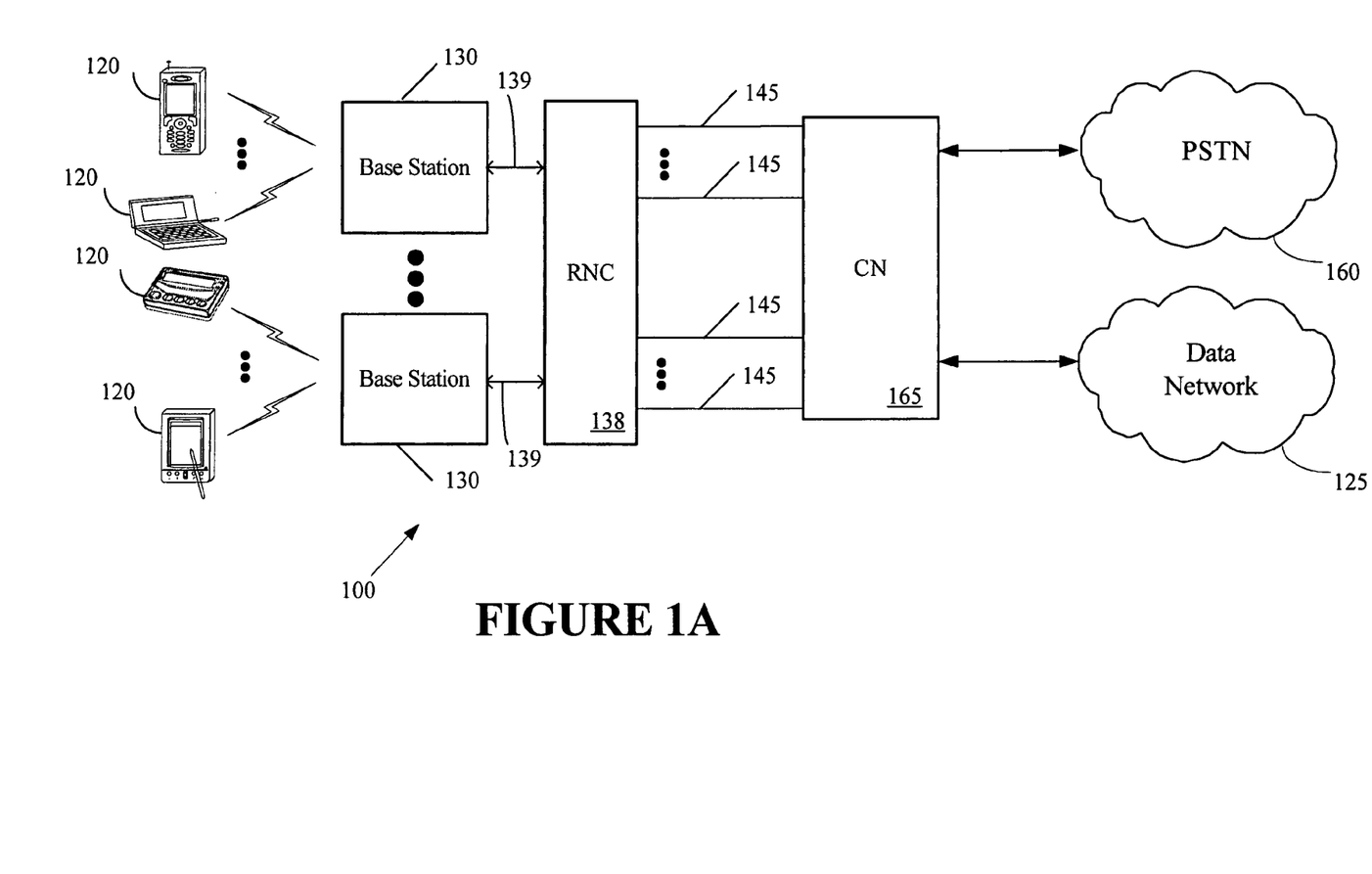
FIG. 1A is a block diagram of a communications system, in accordance with one embodiment of the present invention.

Turning now to the drawings, and specifically referring to FIG. 1A, a communications system 100 is illustrated, in accordance with one embodiment of the present invention. For illustrative purposes, the communications system 100 of FIG. 1A is a Universal Mobile Telephone System (UMTS), although it should be understood that the present invention may be applicable to other systems that support data and/or voice communication. The communications system 100 allows one or more mobile devices 120 to communicate with a data network 125, such as the Internet, and/or a public telephone system (PSTN) 160 through one or more base stations 130. The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130.

In one embodiment, a plurality of the base stations 130 may be coupled to a Radio Network Controller (RNC) 138 by one or more connections 139, such as T1/EI lines or circuits, ATM virtual circuits, cables, optical digital subscriber lines (DSLs), and the like. Although one RNC 138 is illustrated, those skilled in the art will appreciate that a plurality of RNCs 138 may be utilized to interface with a large number of base stations 130. Generally, the RNC 138 operates to control and coordinate the base stations 130 to which it is connected. The RNC 138 of FIG. 1 generally provides replication, communications, runtime, and system management services, and, as discussed below in more detail below, may be involved in coordinating the transition of a mobile device 120 during transitions between the base stations 130.

Figure 1B:
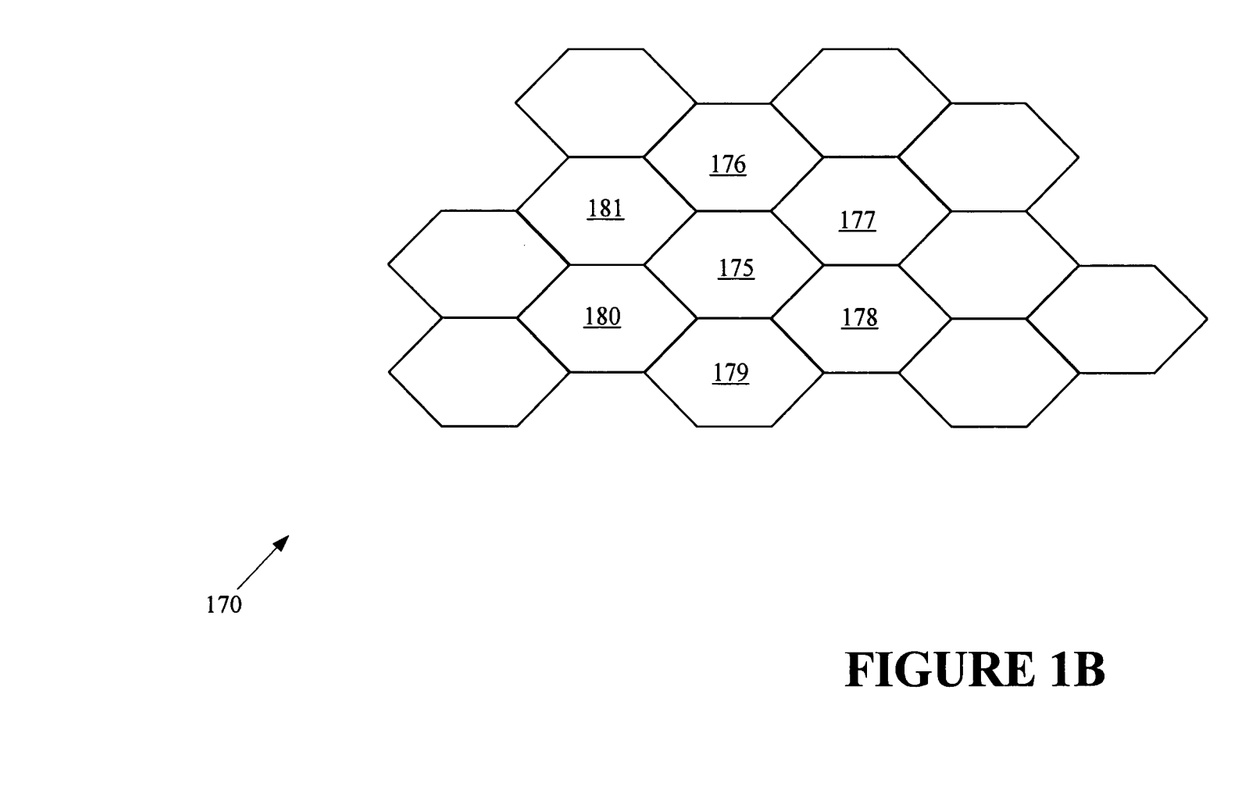
FIG. 1B is a stylistic representation of a region in which the communications system of FIG. 1A may be employed.

As is illustrated in FIG. 1B, a region 170 to be serviced by the system 100 is separated into a plurality of regions or cells, each being associated with a separate base station 130. Typically, each cell has a plurality of adjacent neighboring cells. For example, the cell 175 has six neighboring cells 176-181 such that a mobile device 120 entering the cell 175 may travel from one of the neighboring cells 176-181. Thus, as the mobile device 120 enters the cell 175 from any of the neighboring cells 176-181, the mobile device may need to transition from communicating with the cell 175 to communicating with the neighboring cell 176-181 that it is entering.

Returning to FIG. 1A, the RNC 138 is also coupled to a Core Network (CN) 165 via a connection 145, which may take on any of a variety of forms, such as T1/EI lines or circuits, ATM virtual circuits, cables, optical digital subscriber lines (DSLs), and the like. Generally the CN 165 operates as an interface to the data network 125 and/or to the public telephone system (PSTN) 160. The CN 165 performs a variety of functions and operations, such as user authentication, however, a detailed description of the structure and operation of the CN 165 is not necessary to an understanding and appreciation of the instant invention. Accordingly, to avoid unnecessarily obfuscating the instant invention, further details of the CN 165 are not presented herein.

Thus, those skilled in the art will appreciate that the communications system 100 enables the mobile devices 120 to communicate with the data network 125 and/or the PSTN 160. It should be understood, however, that the configuration of the communications system 100 of FIG. 1A is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
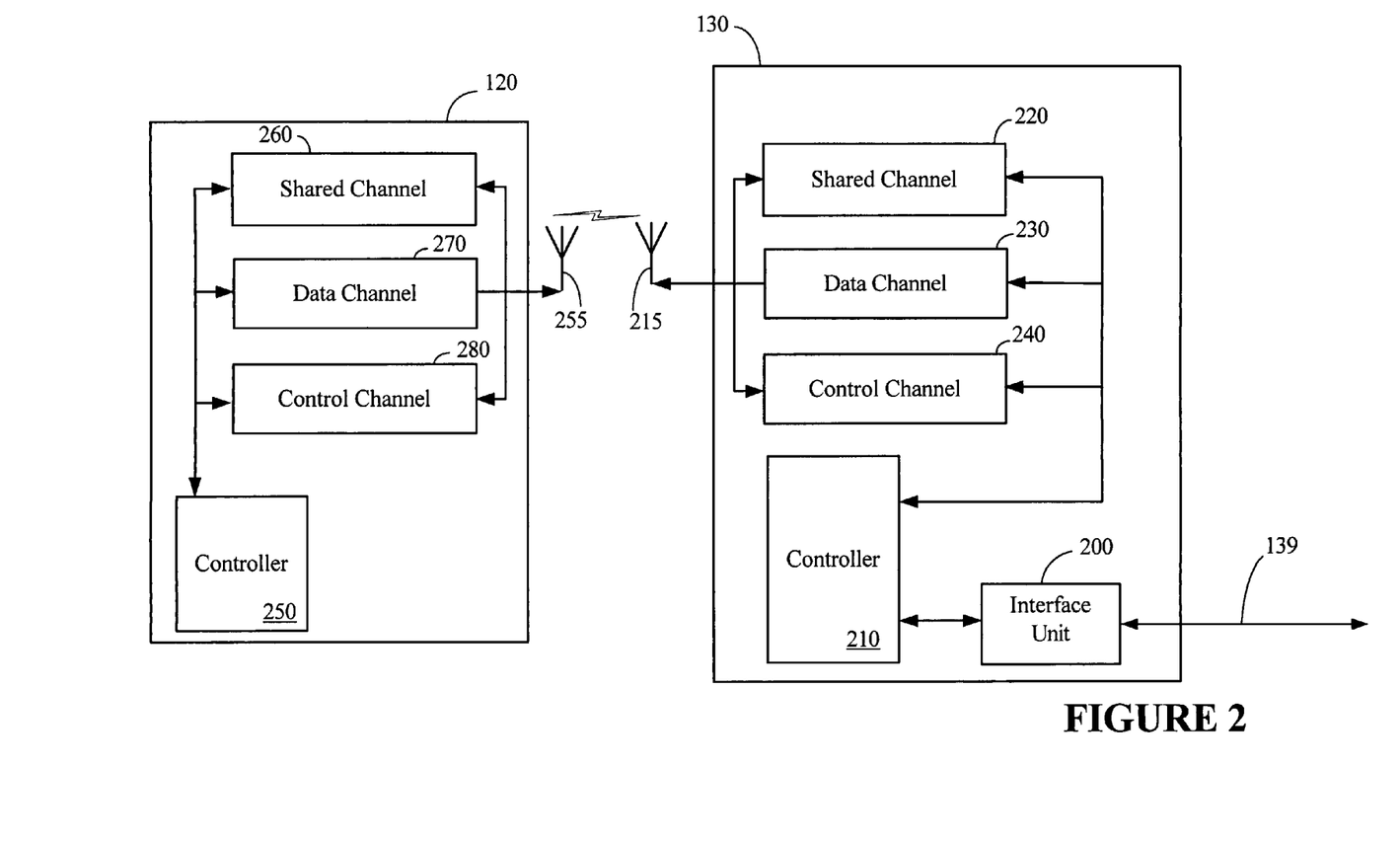
FIG. 2 depicts a block diagram of one embodiment of a Base station and a mobile device used in the communications system of FIG. 1.

Referring now to FIG. 2, a block diagram of one embodiment of a functional structure associated with an exemplary base station 130 and mobile device 120 is shown. The base station 130 includes an interface unit 200, a controller 210, an antenna 215 and a plurality of channels: such as a shared channel 220, a data channel 230, and a control channel 240. The interface unit 200, in the illustrated embodiment, controls the flow of information between the base station 130 and the RNC 138 (see FIG. 1A). The controller 210 generally operates to control both the transmission and reception of data and control signals over the antenna 215 and the plurality of channels 220, 230, 240 and to communicate at least portions of the received information to the RNC 138 via the interface unit 200.

The mobile device 120 shares certain functional attributes with the base station 130. For example, the mobile device 120 includes a controller 250, an antenna 255 and a plurality of channels: such as a shared channel 260, a data channel 270, and a control channel 280. The controller 250 generally operates to control both the transmission and reception of data and control signals over the antenna 255 and the plurality of channels 260, 270, 280.

Normally, the channels 260, 270, 280 in the mobile device 120 communicate with the corresponding channels 220, 230, 240 in the base station 130. Under the operation of the controllers 210, 250, the channels 220, 260; 230, 270; 240, 280 are used to effect a controlled scheduling of communications from the mobile device 120 to the base station 130.

Figure 3:
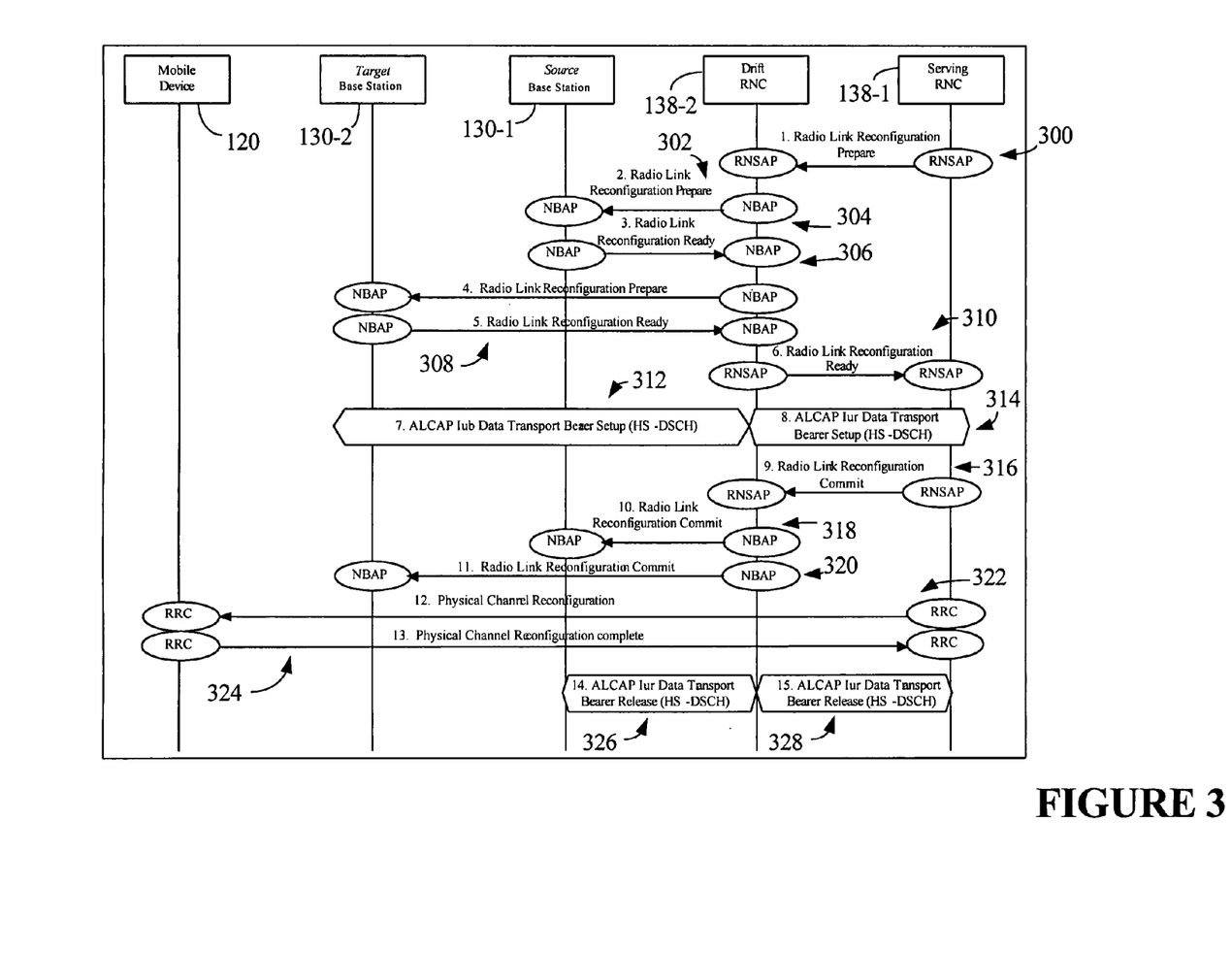
FIG. 3 is a flow diagram illustrating the interoperation of the various components of the communications system of FIGS. 1 and 2.

Turning now to FIG. 3, a flow diagram illustrating the interoperation of the various components of the system 100 is shown. In the flow diagram of FIG. 3, it is assumed that a high speed data transmission is underway with respect to the mobile device 120 such that the mobile device 120 is communicating with base station A, but will be transitioning to base station B. Initially, the mobile device 120 is within the cell associated with base station A and is approaching or entering the cell associated with the base station B.

FIG. 3 stylistically represents a handover procedure for a high speed data channel, generally depicting a messaging process that may be used to switch over the high speed data channel from a serving cell to a target cell. Generally, the actual switchover begins when the RNC 138 sends a Radio Link Reconfiguration Commit messages to the serving Base station 130 to stop the scheduled transmission at a defined "activation time." The mobile device 120 begins "listening" to scheduling information from the target cell at the activation time after sending the "Physical Channel Reconfiguration Complete" messages. A significant factor in reducing VoIP service interruption is the setting of the "activation time" for the switchover from the serving cell to the target cell. Historically, the "activation time" is set at the very early stage of Radio Link Reconfiguration Commit messages and is executed at the time when the mobile device 120 sends the "Physical Channel Reconfiguration Complete." In some prior art systems, the setting time and the execution time may be separated by a significant amount of time (e.g., from hundreds of milliseconds to seconds). The "activation time" is determined based on the process time of the signaling messages (e.g., Iur, Iub and UU). During this interval, a variety of factors could negatively impact the radio channel conditions. For example, the mobile device 120 may move away from the serving cell and the radio link quality could deteriorate significantly such that data could no longer be delivered. It could also happen that mobile device 120 may be unable to decode the scheduling information and missed the data. Thus, VoIP service to the mobile device 120 may be interrupted for a significant amount of time. In one embodiment of the instant invention, the activation time for the switchover process is carefully selected based on current conditions of the radio link between the mobile device 120 and the serving and target base stations.

In a first embodiment of the instant invention, as shown in FIG. 3, the serving RNC 138-1 determines that there is a need to switchover from high speed communications between the mobile device 120 and a source base station 130-1 to high speed communications between the mobile device 120 and a target base station 130-2. The serving RNC 138-1 prepares an RNSAP (Radio Link Reconfiguration Prepare) message, which is transmitted to a drift RNC 138-2 at 300.

In the illustrated embodiment, the source and target cells are controlled by different base stations 130-1, 130-2. The drift RNC 138-2 requests the source base station 130-1 to perform a synchronized radio link reconfiguration using an NBAP (Base station 130 Application Part) message "Radio Link Reconfiguration Prepare" at 302. The source base station 130-1 returns an NBAP message "Radio Link Reconfiguration Ready" at 304.

The drift RNC 138-2 requests the target base station 130-2 to perform a synchronized radio link reconfiguration using the NBAP message "Radio Link Reconfiguration Prepare" at 306. The target base station 130-2 returns the NBAP message "Radio Link Reconfiguration Ready" at 308. The drift RNC 138-2 returns an RNSAP message "Radio Link Reconfiguration Ready" to the serving RNC 138-2 at 310. The drift RNC 138-2 initiates set-up of a new Iub Data Transport Bearers using ALCAP (Access Link Control Application Protocol) protocol at 312. This request contains an AAL2 (ATM Adaptation Layer type 2) Binding Identity to bind the Iub Data Transport Bearer to the high speed data channel.

The serving RNC 138-1 initiates set-up of a new Iur Data Transport bearer using ALCAP protocol at 314. This request contains the AAL2 Binding Identity to bind the Iur Data Transport Bearer to the high speed data channel. The high speed data channel transport bearer to the target base station 130-2 is established. The serving RNC 138-1 proceeds by transmitting the RNSAP message "Radio Link Reconfiguration Commit" to the drift RNC 138-2 at 316. The serving RNC 138-1 selected the activation time in the form of a CFN (Connection Frame Number).

The drift RNC 138-2 transmits the NBAP message "Radio Link Reconfiguration Commit" to the source base station 130-1 including the activation time at 318. Similarly, the drift RNC 138-2 also transmits the NBAP message "Radio Link Reconfiguration Commit" to the target base station 130-2 including the activation time at 320. At the indicated activation time, the source base station 130-1 stops transmitting and the target base station 130-2 starts transmitting on the high speed data channel to the mobile device 120.

The serving RNC 138-1 also transmits an RRC (Radio Resource Control) message "Physical Channel Reconfiguration to the mobile device 120 at 322. At the indicated activation time the mobile device 120 stops receiving high speed data in the source cell and starts receiving high speed data in the target cell. The mobile device 120 returns an RRC message "Physical Channel Reconfiguration Complete" to the serving RNC 138-1 at 324. The drift RNC 138-2 initiates release of the old Iub Data Transport bearer using ALCAP protocol at 326. Similarly, the serving RNC 138-1 initiates release of the old Iur Data Transport bearer using ALCAP protocol at 328.

To reduce or minimize VoIP service interruption during handover, the "activation time" needs to be properly selected. The "activation time" is determined by the processing time of the signaling procedure. If the switchover is set very late and the radio channel condition of the serving cell has deteriorated, the VoIP service will have an open window period of no service. If the activation time is set too early and the radio channel condition of the target cell relative to the specific user is not good, the VoIP service will have an interruption too. The issue of the switchover timing is the unawareness of the radio channel condition when RNC 138-1 sets the activation time. It requires L-3 signaling to communicate between the mobile device 120 and RNC in order to identify the best timing of switchover. Nevertheless, the L-3 signaling delay or latency is large enough to affect the effectiveness of the switchover timing identification. Thus, the criteria of minimizing the VoIP service interruption during the handover are to estimate the required signaling processing time correctly, to reduce the signaling time or latency, and to switch over to the target cell at the right time.

Reducing the latency or time required for signaling during switchover can improve the switchover process. The RNC 138 uses feedback of the radio channel conditions, such as SIR (Signal to Interference Ratio) from the base stations 130 in the active set or mobile reported best cell measurement, to trigger the switchover and to estimate a desired switchover time. However, the accuracy of the estimation deteriorates as the prediction interval becomes larger. In particular, radio channel conditions may changes dramatically in hundreds of milliseconds to seconds. By reducing the interval, the switchover process may be substantially improved.

The base station 130 periodically reports SIR measurements to the RNC 138. In one embodiment, the average SIR is calculated over an 80 ms interval and reported to the RNC 138. The average SIR measurement may be used as a reference of the radio channel condition of each leg during the switchover. The average uplink SIR measurements are a reciprocal of the long-term average of the CQI reports for the downlink radio link. In one embodiment of the instant invention, an algorithm used to calculate "activation time" is as follows, $$\begin{cases} SIR_{Serving} < Threshold_{Serving} \\ SIR_{Target} > Threshold_{target} \end{cases}$$

where $SIR_{Serving}$ and $SIR_{Target}$ are the SIR measurements of the serving cell and the target cell, respectively, and $Threshold_{Serving}$ and $Threshold_{target}$ are the thresholds of the serving cell and target cell, respectively. The algorithm is designed based on link imbalance during the switchover when the uplink inner loop power control would speed up the migration of the radio link to the leg with good channel condition. Thus, the activation time setting could be improved by setting the threshold properly in accordance with the signaling process delay or latency.

The general signaling procedures of switching the high speed data channel from the serving cell to the target cell are performed in series. Since Iub Radio Link Reconfiguration Commit message requires no acknowledgement, the delay may be reduced by sending Iub Radio Link Reconfiguration messages to the serving and target cells as well as UU RRC Physical Layer Reconfiguration message to the mobile device 120 at about the same time, or at least with some overlap. This would remove significant delays and introduce minimum process delay only.

With the concurrent Iub and UU signaling message to commit the switchover of the radio links at the activation time, the processing delay of the UU RRC Physical Channel Reconfiguration message is another factor in the delay. The current performance procedure for the Physical Channel Reconfiguration (see section 13.5.2 of TS25.331) requires the mobile device 120 to execute it within 80 ms after receiving the UU signaling message and update the L1 configuration at the beginning of the next TTI. The DCCH RABs supported in the TS34.108 are 1.7 kbps, 3.4 kbps, and 13.6 kbps with TTI being 80, 40, and 10 ms, respectively. The most common test procedure is the 3.4 kbps DCCH with 40 ms TTI. If the 3.4 kbps DCCH were used to carry the Physical Channel Reconfiguration messages for the high speed data channel switchover, the total delay would exceed 120 ms (80 ms processing+ 40 ms TTI DCCH reception). Moreover, the 80 ms execution delay is also considered by the low signaling RAB for communication of the primitive between higher layer protocols and physical layers at the mobile device 120. Using the 13.6 kbps RAB with 10 ms TTI would reduce the execution time and processing time. It will reduce the interruption of the VoIP service during switchover.

One significant issue of the high speed data channel switchover is to synchronize the buffers at the base stations 130-1 and 130-2 since both Iub links for the serving cell and target cell are established before the Radio Link Reconfiguration Commit commands. To reduce the service interruption, the RNC 138 can send the VoIP data to both of the base stations 130-1 and 130-2 after the Iub data link of the target base station 130-2 is established.

The target base station 130-2 will not schedule any transmission before the "activation time" and has no idea of the scheduled information at the source base station 130-1. Since other channels (e.g., UL DPCH) are operating in the soft-handover mode, the target base station 130-2 may decode the Ack/Nack and CQI information before the "activation time" although that they intend to send to the source base station 130-1. Due to the link imbalance during the switchover, the target cell would decode the Ack/Nack and CQI for the serving cell incorrectly with erasure in the beginning and gradually move into correct decoding before the "activation time". The target cell could decide to drop a VoIP frame every $T_{erasure}$ interval if the Ack/Nack and CQI are erased. The $T_{erasure}$ interval is a parameter to be optimized for minimizing the buffer occupancy at the target cell. If the Ack is decoded correctly at the target cell before the activation time, the target cell could determine to drop the next VoIP packet. This procedure is an uncoordinated VoIP counting for the high speed data channel when the VoIP packet has been sent to both the serving and target cells during the switchover before the activation time. This will avoid any data gap for the sequence delivery of the VoIP packet and minimize the buffer occupancy at the target cell. The proposed algorithm is called "Pseudo-Synchronization" because its behavior is similar to the buffer synchronization.

One cause of the signal processing delay or latency arises from the use of Layer 3 (L-3) signaling procedures during the handover process. As discussed above, to reduce quality degradation for VOIP over a high speed data channel, it may be useful in some applications to reduce the latency of the switchover during the handover process. One method that may be employed to reduce latency involves using Site Selection Diversity Transmit (SSDT) type Layer 1 (L-1) signaling to assist channel switchover during handover. Additionally, plane signaling in the UMTS Terrestrial Random Access Network (UTRAN) may also be used to assist the switchover of the data transfer from the RNC 138 to the serving base station 130-1 to the target base station 130-2.

Generally, in one embodiment of the instant invention, L-1 signaling is used to identify the primary serving cell during the handover after measurements made by the mobile device 120 indicate the best cell is not the current serving cell. Based on these measurements, the mobile device 120 indicates its new primary serving or target cell. Once the cells receive the indication of the new primary serving cell from the mobile device 120, all cells send the primary/non-primary cell indications to the RNC 138. The RNC 138 responds by switching the user plane traffic to the Iub/Iur transport of the new primary or target cell. The L-3 signaling messages are subsequently used to complete the handover procedure. The proposed solution will reduce the delay caused by L-3 signaling.

Figure 4:
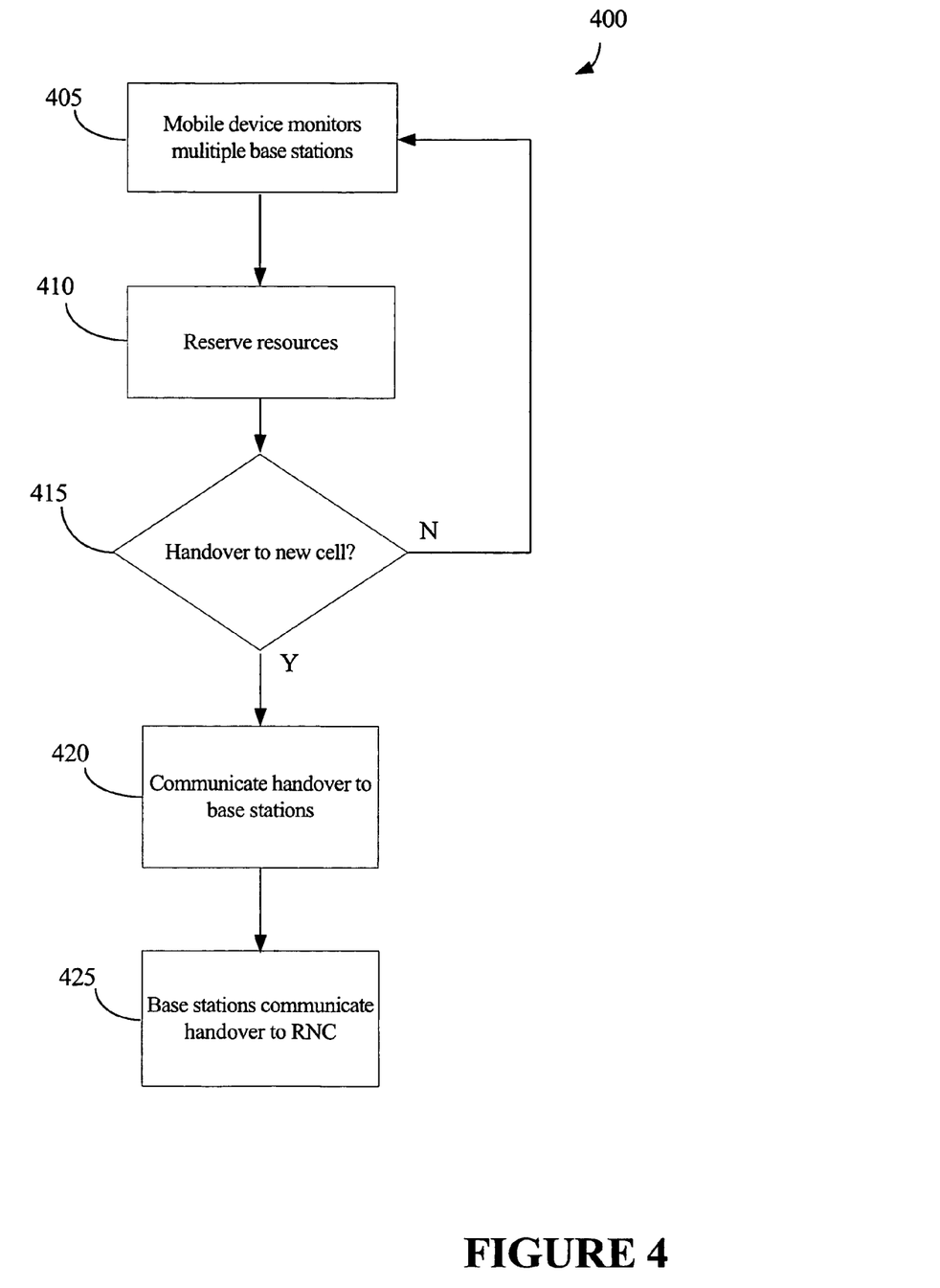
FIG. 4 is a flow diagram illustrating one embodiment of a control strategy employed in the communications system of FIGS. 1-3 for handling handover between a first and second base station.

Turning to FIG. 4, a stylized representation of one embodiment of a handover control strategy 400 is illustrated. The process begins at block 405 with the mobile device 120 monitoring certain parameters of at least a portion of the base stations in its active set to determine the quality of communications. While a communications session is only established with the primary serving cell, the mobile device 120 nonetheless monitors one or more channels of the other base stations in its active set to determine the quality of communications that would be available should a handover occur. At block 410, the mobile device 120 makes a request of at least a portion of the base stations 130 in its active set that resources needed to conduct high speed communications be reserved.

At block 415, the mobile device 120, using the monitored parameters of each of the base stations 130 determines whether a handover is warranted. If not, control returns to block 405 where the process repeats. On the other hand, if the monitored parameters indicate that a handover should be performed, then control transfers to block 420 where the mobile device 120 communicates its desire for a handover to occur to a select one of the monitored base stations 130. The mobile device 120 provides this indication to at least the primary serving cell and the target cell. At block 425, each of the base stations 130 communicates the handover to the RNC 138. Thereafter, the RNC 138 effects the handover in a manner as described above, ceasing the delivery of high speed data to the primary serving cell and beginning the delivery of high speed data to the target cell at a preselected time.

During a soft handover, the RNC 138 sends the following information to the mobile device 120: the cells that the mobile device 120 should be monitoring; the radio channel information (HS-SCCH code number, H-RNTI, etc.) for any new cells to be monitored; and the expected MAC-hs TSN reset during cell change.

The mobile device 120 will monitor a high speed Shared Control Channel (HS-SCCH) in all cells that it is commanded to monitor in the active set (in some embodiments of the invention this may be the whole active set) during the soft handover and store information regarding each. The stored information will enable the mobile device 120 to react quickly when radio channel condition changes. The number of cells that a mobile device 120 may be instructed to monitor may be determined as a function of the type or capability of the mobile device 120. Additionally, the RNC 138 can periodically re-assign which cells in the active set that the mobile device 120 should monitor.

Generally, all cells considered as candidate cells for fast cell selection (FCS) are reserved with high speed data shared channel (HS-DSCH) resources, which will enable the mobile device 120 to report FeedBack Information (FBI) bits to the base station 130 to identify the primary base station, and to send high speed data from the primary base station as commanded by the RNC 138.

As discussed above, resources are reserved to get ready for the high speed data serving link switchover. In one embodiment of the instant invention, Iub, Iur, and all network node process resources are reserved. In particular, the Iub and Iur RL Reconfiguration Prepare and ALCAP procedures will be set at the same time when DPCH is in soft handover. The mobile device 120 performs a best cell selection measurement and the measurement results are reported back to the RNC 138 through L-1 signaling (instead of RRC signaling, as was done in prior systems). The results of the best cell selection by the mobile device 120 triggers the primary cell selection through the signal strength measurements via FBI bits to report to the base stations for primary base station indication. Multiple Iub/Iur links are set up but only the primary cell Iub link is active at a given time. Thus, there is no significant increase in backhaul traffic volume. Alternatively, the RNC 138 may set up the high speed data channel resources and transport resources in all cells, and the base station 130 will remain silent on the high speed control channel until such a time that the RNC 138 forwards some data to it.

The FBI bits in the up-link data control channel (UL DPCCH) slot format 2, 3, 4, and 5 may be used to indicate the switchover of the serving cell. The primary cell indication is used for the fast cell selection instead of dynamic serving cell selection (ping pong) during the soft handover of the SSDT feature.

In one embodiment of the instant invention, the Cell ID of the FBI bits sent by the mobile device 120 is accumulated in interval N slots (depending on Long, Medium, or Short ID code and FBI bits format) in sliding window fashion at the base station 130. If N consecutive primary ID codes are received and identified at the target cell, the target cell shall consider itself as the primary cell and will be switched over to the primary serving cell in T ms. The accumulation of Cell-ID codes would also improve the reliability of the FBI bit decoding since the FBI bits are 15 or 30 bits per radio frame without channel coding protection. The interval (N slots) is a configurable parameter and would be optimized on the field.

Alternatively, the Base station 130 can just forward the decoded Cell-ID for the primary cell by the user plane frame up to the RNC 138 and the RNC 138 can switch the user plane data to the new cell.

The FBI bit generation for the L-1 signaling may be triggered by the same criteria as best cell selection. The measurement occurs within the mobile device 120 and does not need to be reported back to the RNC 138. Alternatively, the mobile device 120 will send the Cell-ID FBI bits for the L-1 signaling T ms ahead of the actual switchover to allow the RNC 138 to switch the Iub/Iur link from the current cell to the target cell. The time advance T is a configurable parameter.

In an alternative embodiment of the instant invention, a particular Cell ID may be regarded as no cell change to the mobile device 120 and base station 130, and the base station 130 would not forward this information up to the RNC 138. In this way the signaling load could be reduced.

Turning now to a discussion of user plane signaling for backhaul (Iub/Iur Frame Protocol for the HSDPA primary cell indication, the fastest way to have the RNC 138 switch the high speed data from the serving cell to the target cell is the Iub/Iur Frame Protocol.

A proposal currently exists to change the Third Generation Partnership Project (3GPP) standard Iub/Iur Frame Protocol to have the header contain an indication of the primary cell/non-primary cell during the handover when the mobile device 120 stored multiple high speed data configurations and UMTS Terrestrial Random Access Network (UTRAN) already set up the Iub/Iur link for the target cells in the active set. Under the proposed change, once the base station 130 receives the Cell-ID through FBI bits to indicate the switchover of the serving cells, all base stations 130 will send UL Iub/Iur Frame protocol control frame to indicate the status of primary or non-primary serving cell for each cell. The RNC 138 will start sending the data to the new primary cell after the reception of the UL Iub/Iur frame protocol with indication of the serving cell switchover.

The Iub/Iur protocol could also be enhanced to include the MAC-d flow pointer being served by the current serving cell to feedback to the RNC 138. This will allow the RNC 138 to sync-up the MAC-d served by the current base station 130.

Note that during the period just before the mobile device 120 handover, the RNC 138 may hold the DL MAC-d data flow in its buffer to give a chance to the old primary leg to flush its MAC-HS priority queue before the switchover. The configured advanced switchover time (T ms) is designed to allow the current primary cell to serve out all the MAC-d data in its buffer. This would reduce data loss during the handover. The mobile device 120 will deduce that the cell change has occurred through the decoded transmission of the HS-DSCH Radio Network Temporal Identifier (H-RNTI) on the high speed control channel of the new cell. The mobile device 120 will then determine whether to perform a MAC-hs Transmission Sequence Number (TSN) reset and start decoding from the new cell.

The L-3 signaling will follow the actual handover to complete the high speed data channel handover procedure. The current RL Reconfiguration Commit and RRC Physical Channel Reconfiguration messages will follow up after the L-1 signaling. The "activation time" would set to "now" if the L-1 signaling were used for the indication of the switchover.

Those skilled in the art will appreciate that the FCS fast handover for the VOIP over high speed data channel described herein uses L-1 signaling to quickly indicate the switchover of the serving cell. This will reduce service interruption during the hard handover of the high speed service.

Those skilled in the art will appreciate that the various system layers, routines, or modules illustrated in the various embodiments herein may be executable control units (such as the controllers 210, 250 (see FIG. 2)). The controllers 210, 250 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers 210, 250 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for controlling a communications system, comprising:
    monitoring, at a mobile unit having an active communication session with a first base station, a quality of a first packet data channel between the mobile unit and the first base station and a quality of a second packet data channel between the mobile unit and each of one or more second base stations;
    deciding, at the mobile unit, to perform a hard hand off from the first base station to a selected one of said second base stations using a comparison of the monitored qualities of the first and second packet data channels; and
    transmitting, from the mobile unit, a level-1 type handoff signal that originates in a physical layer of the mobile unit and indicates that the selected second base station is a new primary base station.

2. A method, as set forth in claim 1, further comprising reserving resources in the selected second base station for the second packet data channel between the selected second base station and the mobile unit, the resources being reserved in response to receiving the level-1 type handoff signal.

3. A method, as set forth in claim 2, comprising completing the hard hand off using level-3 signaling following transmission of the level-1 type handoff signal.

4. A method, as set forth in claim 3, wherein reserving resources in the selected second base station further comprises reserving resources in the selected second base station, wherein the reserved resources are associated with communicating with the selected second base station using feedback information bits.

5. A method, as set forth in claim 1, wherein monitoring qualities associated with the first base station and the selected second base station further comprises monitoring the quality of a communications channel associated with the first and second base stations.

6. A method, as set forth in claim 5, wherein transmitting the level-1 type handoff signal comprises sending the level-1 type handoff signal to the first and second base stations indicating that the selected second base station is the primary base station in response to the quality of the communications channel associated with the selected second base station exceeding the quality of the communications channel associated with the first base station.

7. A method, as set forth in claim 1, wherein transmitting the level-1 type handoff signal comprises sending feedback information bits to the first and second base stations indicating that the selected second base station is the primary base station in response to the monitored qualities.

8. A method, as set forth in claim 1, further comprising reserving resources in the second base station in response to receiving the level-1 type handoff signal, wherein the reserved resources are associated with communicating between the second base station and a mobile device.

9. A method, as set forth in claim 8, wherein reserving resources in the second base station further comprises reserving resources in the second base station, wherein the reserved resources are associated with communicating between the second base station and the mobile device using a level 1 type handoff signal.

10. A method, as set forth in claim 9, wherein reserving resources in the second base station further comprises reserving resources in the second base station, wherein the reserved resources are associated with communicating between the second base station and the mobile device using feedback information bits.

11. A method, as set forth in claim 1, wherein transmitting the level-1 type handoff signal comprises transmitting the level-1 type handoff signal that indicates that the hard handoff is to be activated immediately, wherein the first base station stops scheduled transmissions to the mobile unit at an activation time, and wherein the mobile unit begins listening to the selected second base station at the activation time.

12. A method for controlling a communications system including a first and second base station and a radio network controller, comprising:
    establishing the first base station as a primary base station for a mobile unit;
    receiving, from the mobile unit and at the first and second base stations, feedback information in a level-1 type handoff signal originating in a physical layer of the mobile unit and indicating that the second base station is the primary base station, thereby enabling a packet channel switchover by hard handoff;
    using level-3 signaling to complete the packet channel switchover using the hard handoff following receiving the level-1 type handoff signal.

13. A method, as set forth in claim 12, wherein receiving the level-1 type handoff signal at the first and second base stations indicating that the second base station is the primary base station further comprises receiving feedback information bits at the first and second base stations indicating that the second base station is the primary base station.

14. A method, as set forth in claim 12, wherein transmitting the signal from each of the first and second base stations to the radio network controller indicating that the second base station is the primary base station further comprises sending a control frame.

15. A method, as set forth in claim 12, wherein transmitting the signal from each of the first and second base stations to the radio network controller indicating that the second base station is the primary base station further comprises sending a frame protocol control frame.

16. A method, as set forth in claim 12, wherein transmitting the signal from each of the first and second base stations to the radio network controller indicating that the second base station is the primary base station further comprises sending an Iub/Iur frame protocol control frame.

17. A method, as set forth in claim 12, wherein receiving feedback information in the level-1 type handoff signal comprises receiving the feedback information indicating that the hard handoff is to be activated immediately, wherein the first base station stops scheduled transmissions to the mobile unit at an activation time, and wherein the mobile unit begins listening to the second base station at the activation time.

18. A method, comprising:
   receiving, at a radio network controller, information from a plurality of base stations in response to a mobile unit providing a level-1 type handoff signal to the plurality of base stations, wherein the information indicates a new primary base station that is different than a current primary base station in the plurality of base stations;
   initiating a hard handoff of the mobile unit from the current primary base station to the new primary base station by switching user plane traffic from a first interface to the current primary base station to a second interface to the new primary base station; and
   using level-3 signaling to complete the hard handoff of the packet channel after switching the user plane traffic.

19. A method, as set forth in claim 18, wherein the level-1 type handoff signal indicates that the hard handoff is to be activated immediately, wherein the current primary base station stops scheduled transmissions to the mobile unit at an activation time, and wherein the mobile unit begins listening to the new primary base station at the activation time.

20. A method, as set forth in claim 18, wherein receiving the information from the plurality of base stations comprises receiving information from each of the plurality of base station indicating whether a corresponding base station is a primary or non-primary base station.

* * * * *